(12) United States Patent
Concha et al.

(10) Patent No.: US 7,386,985 B2
(45) Date of Patent: Jun. 17, 2008

(54) DETECTION OF REFRIGERANT CHARGE ADEQUACY BASED ON MULTIPLE TEMPERATURE MEASUREMENTS

(75) Inventors: Julio I. Concha, Rocky Hill, CT (US); Robert J. Braun, Windsor, CT (US); Sivakumar Gopalnarayanan, Simsbury, CT (US); Don A. Schuster, Lindale, TX (US); Sathish R. Das, Indianapolis, IN (US)

(73) Assignee: Carrier Corporation, Farmington, CT (US)

( * ) Notice: Subject to any disclaimer, the term of this patent is extended or adjusted under 35 U.S.C. 154(b) by 281 days.

(21) Appl. No.: 11/294,183

(22) Filed: Dec. 5, 2005

(65) Prior Publication Data

US 2007/0125102 A1 Jun. 7, 2007

(51) Int. Cl.
  *F25B 45/00* (2006.01)
(52) U.S. Cl. ............... 62/77; 62/127; 62/129; 62/149; 62/208; 62/209
(58) Field of Classification Search .......... 62/127, 62/129, 149, 183, 184, 208, 209, 77, 292
See application file for complete search history.

(56) References Cited

U.S. PATENT DOCUMENTS

| | | | |
|---|---|---|---|
| 5,586,445 A * | 12/1996 | Bessler | 62/126 |
| 6,308,523 B1 | 10/2001 | Scaringe | |
| 2005/0229612 A1* | 10/2005 | Hrejsa et al. | 62/149 |
| 2006/0032247 A1* | 2/2006 | Kates | 62/129 |
| 2006/0042276 A1* | 3/2006 | Doll et al. | 62/129 |
| 2007/0089439 A1* | 4/2007 | Singh et al. | 62/129 |

* cited by examiner

*Primary Examiner*—Mikhail Kornakov
*Assistant Examiner*—David W Greaves
(74) *Attorney, Agent, or Firm*—Marjama Muldoon Blasiak & Sullivan LLP

(57) ABSTRACT

The refrigerant charge adequacy of an air conditioning system is determined by the sensing of two temperatures in the system, one being at a midpoint in a condenser coil and the other being the temperature in the liquid line of the condenser discharge, with the difference then being indicative of the degree of subcooling, which, in turn, may be indicative of refrigerant charge condition. The method is refined by measuring a third temperature at the compressor discharge, with the three temperature values then being used to calculate a pair of residual values which provide an indication of whether the two temperature approach is useful in determining charge adequacy under the existing conditions and if not, whether the system is overcharged or undercharged.

9 Claims, 4 Drawing Sheets

DETECTION OF REFRIGERANT CHARGE ADEQUACY BASED ON MULTIPLE TEMPERATURE MEASUREMENTS

BACKGROUND OF THE INVENTION

The invention relates generally to subcritical vapor compression systems that use expansion devices to control compressor suction superheat and, more particularly, to a method and apparatus for determining refrigerant charge adequacy in an air conditioning system.

Maintaining proper refrigerant charge level is essential to the reliable and efficient operation of an air conditioning system. Improper charge level, either in deficit or in excess, can cause premature compressor failure. An over-charge in the system results in compressor flooding, which, in turn, may be damaging to the motor and mechanical components. Inadequate refrigerant charge can lead to increased power consumption, thus reducing system capacity and efficiency. Low charge also causes an increase in refrigerant temperature entering the compressor, which may cause thermal overload of the compressor. Thermal overload of the compressor can cause degradation of the motor winding insulation, thereby bringing about premature motor failure.

The traditional techniques for assessing the charge level are the superheat method for fixed-orifice systems and the subcool method for systems equipped with an expansion valve. Normally, a service technician performs refrigerant charge assessments manually using pressure gauge(s) and temperature meter(s). In an automated type sensor, both techniques require a pressure transducer to measure the pressure and ultimately the saturation temperature of the refrigerant at some point in the circuit. Pressure transducers are undesirable due to relative high cost and must be inserted in the circuit which can cause pressure drops and potential leaks.

SUMMARY OF THE INVENTION

A very common method to assess the refrigerant charge level is by measuring the subcooling temperature at the discharge of the condenser. This measurement requires a pressure sensor at the condenser outlet. However, an approximate value of the subcooling temperature can be obtained without this pressure sensor, as follows. When the refrigerant charge is close to its normal value, the refrigerant going through the condenser goes from a gaseous state at the condenser inlet to a subcooled liquid state at the discharge. Near the middle of the condenser, the refrigerant is in a saturated state. A temperature sensor located there measures the refrigerant temperature. The pressure drop through the condenser is typically very small, so this refrigerant temperature is a good approximation to the saturation temperature at the condenser discharge. A second temperature sensor is used to measure the refrigerant temperature at the condenser outlet. The difference between the temperatures measured by the sensors is a good indicator of the charge level and correlates strongly with the subcooling temperature.

The above described method has been proposed to assess the refrigerant charge level of vapor compression system. However, it works sufficiently well only as long as a saturated refrigerant condition is achieved in the middle portion of the condenser. If charge in the system is significantly above the normal level, then liquid accumulates in the condenser to such an extent that condensation takes place very close to the condenser inlet. The temperature measured by a sensor near the middle of the condenser is not close to the saturation temperature in this case. Similarly, if the charge in the system is significantly below the normal level, then condensation may not take place at all. The temperature measured by sensor is not close to the saturation in this case either.

The present invention proposes to detect the anomalous conditions described hereinabove using, in addition to a coil temperature sensor and a liquid line temperature sensor, a third temperature sensor located near the discharge of the compressor. It can be said that, generally, the compressor discharge temperature is higher than normal when these conditions exist.

Using the sensed temperatures from the three temperature sensors, a pair of residuals R1 and R2 are calculated using predetermined equations, with the R1 and R2 residuals value then being applied to determine whether the approach of using the coil temperature difference as an indicator of charge level is feasible or not irrespective of whether the charge level is extremely low or extremely high or in the correct range.

In the drawings as hereinafter described, a preferred embodiment is depicted; however, various other modifications and alternate constructions can be made thereto without departing from the true spirit and scope of the invention.

DESCRIPTION OF THE PREFERRED EMBODIMENT

Figures 1, 2:
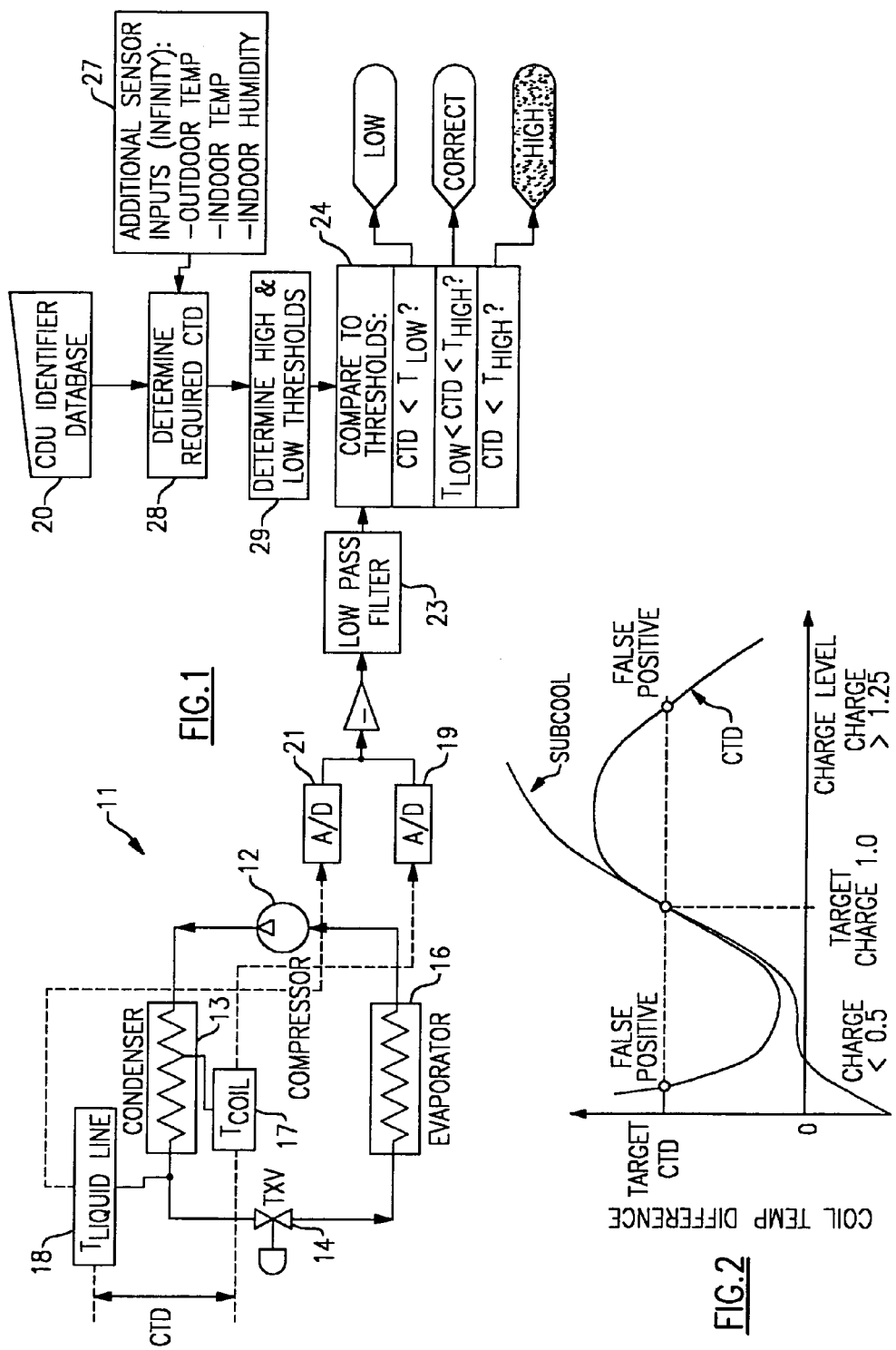
FIG. 1 is a schematic illustration of the present invention in accordance with one embodiment thereof.
FIG. 2 is a graphic illustration of the zones of reliability/unreliability of a two sensor embodiment of the present invention.

Referring now to FIG. 1, there is shown generally at 11 a vapor compression system that includes a compressor 12 for delivering hot, high pressure refrigerant gas to a condenser 13 where the gas is cooled by another fluid, such as outdoor air, and undergoes a phase change from gas to a liquid. The subcooled liquid is expanded at an expansion device 14 so that its pressure and temperature are significantly reduced. Finally, the refrigerant goes through a second heat exchanger or evaporator 16, where it is heated by another fluid such as indoor air.

In accordance with the present invention, the CTD method utilizes a coil temperature sensor 17 installed near the middle of the condenser 13 so as to enable the measurement of the refrigerant temperature therein. If the refrigerant charge in the system is near the proper level, the refrigerant of the middle of the condenser 13 is in a saturated state and the temperature sensed by the coil temperature sensor 17 provides a good approximation to the saturation temperature at the condenser discharge.

A liquid line temperature sensor 18 is provided at the condenser outlet so as to enable the measurement of the refrigerant temperature at that point. The difference between the temperatures measured by the sensors 17 and 18 is referred to as the coil temperature difference (CTD) and, to the extent that the refrigerant charge is relatively close to the proper charge, this value provides a good indication of the charge level since this correlates strongly with the subcooling temperature over moderate temperature ranges.

As will be seen in FIG. 1, the outputs from the coil temperature sensor 17 and the liquid line temperature sensor 18 are passed to A/D converters 19 and 21, respectively, with the difference then being calculated by a comparator 22 to obtain the coil temperature difference (CTD). After passing through a low pass filter 23 the CTD passes to a microprocessor 24 where it is compared with established thresholds.

The manner in which the thresholds are established is to first establish a system or compressor-condenser subsystem identifier database 26 wherein various operating parameters and characteristics are considered. From this data, and possibly from other additional sensor inputs as shown in block 27, a required core temperature difference is determined at block 28. The tolerance is then considered and high and low thresholds are determined at block 29. For example, a desired CTD may be 8° F. and a tolerance of ±3° F. provides thresholds of 5° F. on the low side and 11° F. on the high side. Accordingly, as calculated in block 24, if the CTD is below 5° F., for example, the microprocessor 24 will determine that the refrigerant charge is to low. If the microprocessor 24 determines that the CTD is greater than 11° F., there will be an indication that the refrigerant charge is high. If the CTD is between 5 and 11° F., the microprocessor 24 will indicate a correct refrigerant charge.

The basic CTD method works well for moderate variations in outdoor temperatures (e.g. 70° F. to 100° F.). Over extreme ranges of temperatures (e.g. 55° F. to 125° F.) a correction scheme for the CTD may be employed. This scheme employs an empirical non linear curve fit based on the liquid line temperature. Coefficients are obtained using conventional mathematical methods.

Correction Formula $$CTDCorr = Corr*(k*LLS^2 + 1*LLS + m)$$

Where:
Corr=empirically determined coefficient based on individual product
LLS=Liquid Line Temperature
k, l and m=coefficients Typical values of the coefficients are Corr between −4 and 4, k=0.00008, l=−0.0147, m=0.68

The two sensor method described above can work well when it is known that the charge level in the system is close to the correct charge level. However, if the charge level can change dramatically from almost zero charge to extremely high charge, the two sensor method will have limitations. For these applications a new method must be used as described below.

Referring now to FIG. 2, there are shown representative values of coil temperature differences as a function of charge level in an air conditioning system. As determined in block 28 of FIG. 1, the target CTD corresponds to a target charge of 1.0. As will be seen from the area within the dotted oval, when the refrigerant charge is close to the target charge, the CTD is substantially a straight line relationship to the charge level. However, for charge values that vary substantially from the target charge of 1.0 multiple charge levels can have same CTD value. From this data, it can be concluded that, for extreme undercharge or overcharge conditions, it is impossible to detect the particular condition using only two sensors as described in FIG. 1. In FIG. 2 there is also shown the subcooling in the system as a function of charge level. This shows that the CTD and subcooling show entirely different response as a function of charge level.

Figure 3:
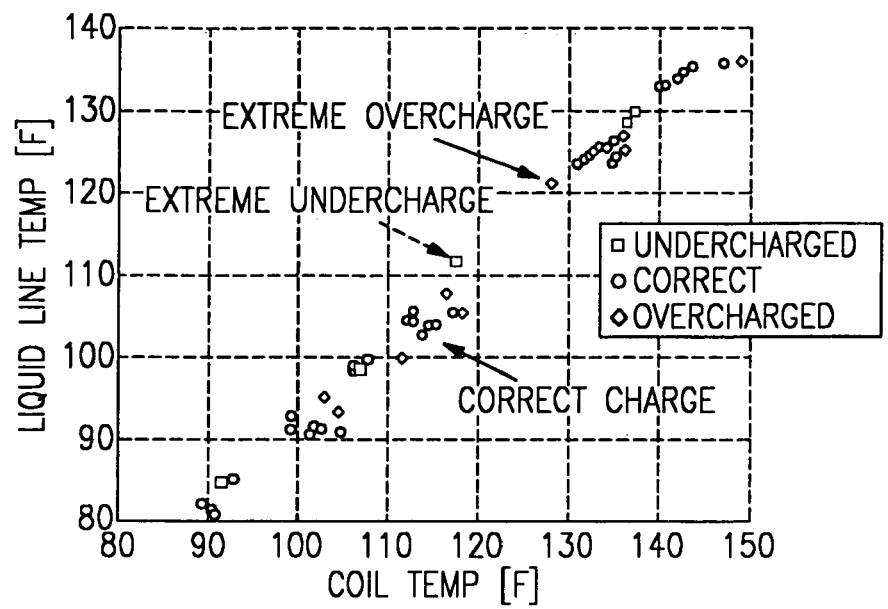
FIG. 3 is a graphic illustration of refrigerant charge conditions as a function of both coil temperature and liquid line temperature.

This phenomenon can be shown in an alterative method by plotting typical liquid line temperatures as a function of coil temperatures for various refrigerant charge conditions (FIG. 3). It will be seen that there is no detectable pattern for the various points illustrative of correct charge, extreme undercharge, and/or extreme overcharge conditions. That is, each of these conditions has points which are spread over a range of positions with no detectable pattern representative of any of the three conditions.

Figure 4:
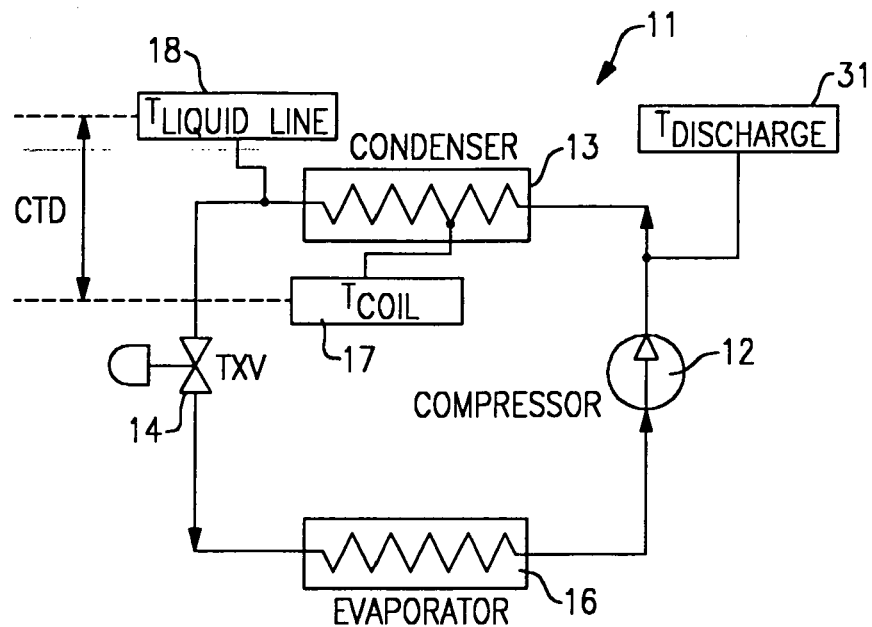
FIG. 4 is a schematic illustration of an alternative embodiment of the present invention.
Figure 5:
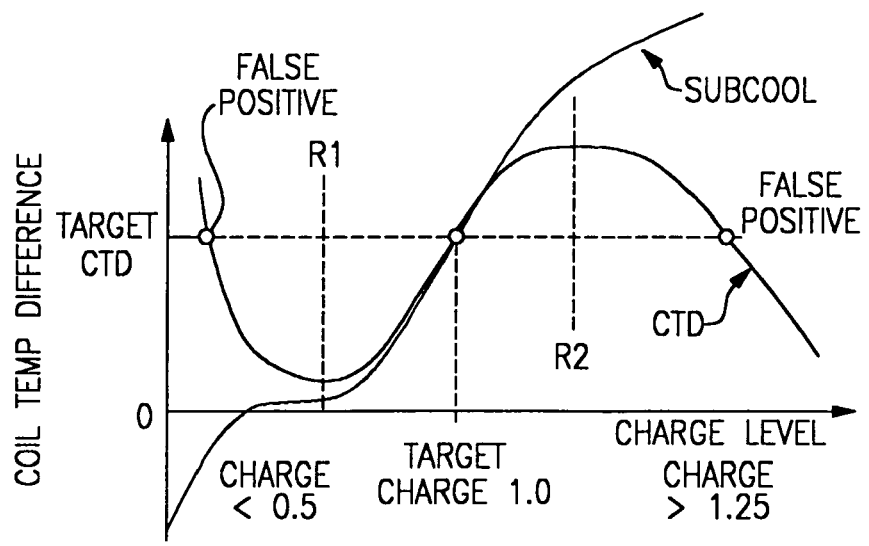
FIG. 5 is a graphic illustration of a method in which calculated residuals R1 and R2 and can be used to differentiate between extreme charge regions.

In order to overcome the problems associated with using only two temperature sensors for the measurement of refrigerant charge adequacies as discussed hereinabove, the FIG. 1 system is modified by the addition of a compressor discharge temperature sensor 31 as shown in FIG. 4. In this regard, it has been generally recognized by the inventors that for extreme charge conditions (i.e. either very low charges or very high charges), the compressor discharge temperature is generally higher than normal. Thus, this third temperature measurement can be used to provide a coarse scale or macroscopic discrete determination of the refrigerant charge outside the useful range of the above described two-sensor CTD method. This is executed by the use of predetermined calculations which indicate whether or not the two temperature sensor approach may be reliably used and if not, whether the charge is high or low in the system. This is accomplished by the application of a pair of residual values R1 and R2 as shown in FIG. 5 so as to differentiate between extreme charge regions.

In a preferred embodiment, a residual R1 is computed according to the equation $$R1 = a*T\_C + b*T\_LL + c*T\_CD + d*T\_CD^2 + e$$

where:
T_C is the temperature at the condenser, measured by sensor (17)
T_LL is the temperature at the liquid line, measured by sensor (18)
T_CD is the temperature at the compressor discharge, measured by sensor (31)
a, b, c, d, e are constant numbers.

The coefficients a, b, c, d and e are predetermined in such a way that R1>0 (or other predetermined R1 threshold value) whenever the refrigerant charge is extremely high or low, in the sense that the refrigerant near sensor 17 is not saturated, (i.e. it is superheated gas or subcooled liquid). At the same time, R1<0 (or other predetermined R1 threshold value) whenever this is not the case.

In addition, a second residual R2 is computed according to the equation $$R2 = f*T\_C + g*T\_LL + h*T\_CD + i*T\_CD^2 + j$$

where f, g, h, i and j are constant numbers such that R2>0 (or other predetermined R2 threshold value) whenever R1<0 and the refrigerant near sensor 17 is subcooled liquid, and R2<0 (or other predetermined R2 threshold value) whenever R1<0 and the refrigerant near sensor 17 is superheated gas.

Therefore, the charge condition of the system can be deduced from the following table:

| R1 | R2 | Charge |
| --- | --- | --- |
| Negative | Any | normal or nearly normal -> use CTD method to determine exact charge |
| Positive | Positive | significantly overcharged |
| Positive | Negative | Significantly undercharged |

There are several methods to compute the coefficients a, b, c, d, e, f, g, h, i and j. In the preferred embodiment, a large set of experimental data is collected. The data consist of measurements of the three relevant temperatures, plus classification labels indicating whether each data point corresponds to a correct, significantly high or significantly low level of charge. Then, the coefficients a, b, c, d and e are found by computing a support vector classifier. Appropriate methods are known to those skilled in the art and are well documented in the publicly available technical literature. The coefficients f, g, h, i and j are computed similarly.

In the preferred embodiment, the computation of R1 and R2 is carried out by a microcontroller, based on the measurements from the three temperature sensors 17, 18 and 31. If the charge is found to be significantly high or low, an alarm is raised so that the user can take appropriate corrective action.

Figure 8:
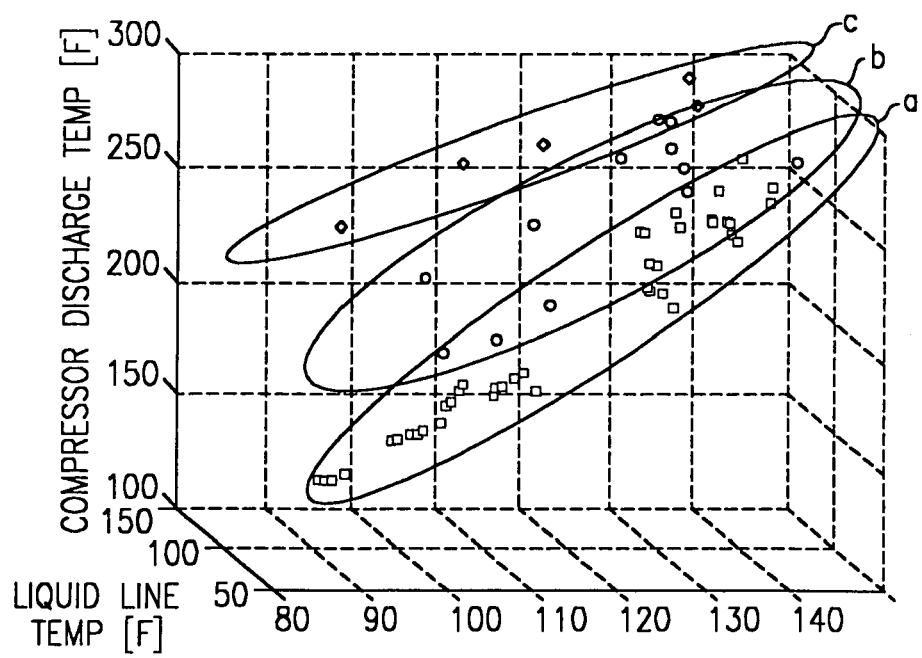
FIG. 8 is a three dimension graphic illustration of various zones of refrigerant charge adequacy/inadequacy.
Figure 6:
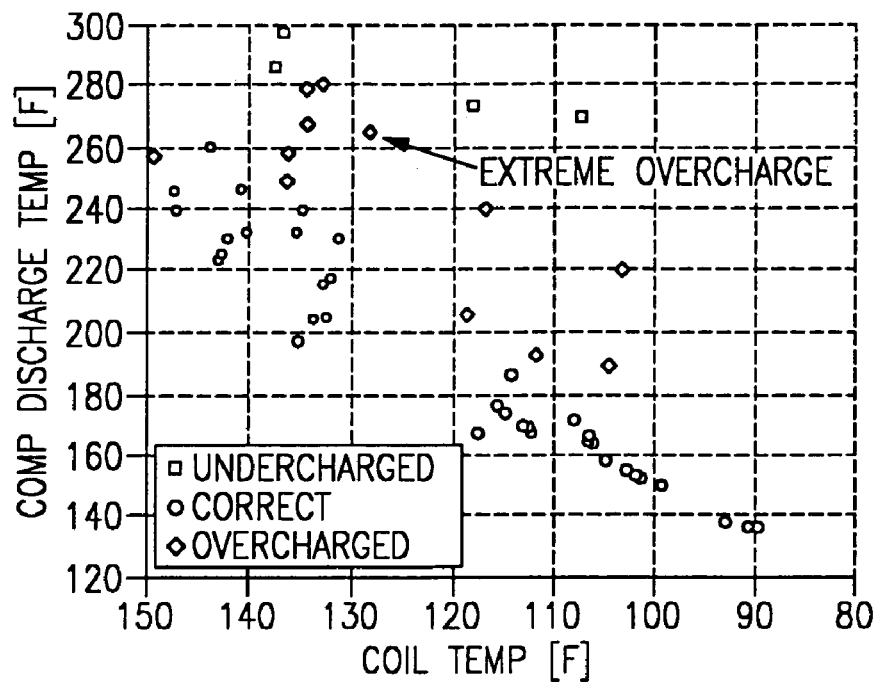
FIG. 6 is a graphic illustration of various refrigerant charge conditions as a function of both coil temperature and compressor discharge temperature.
Figure 7:
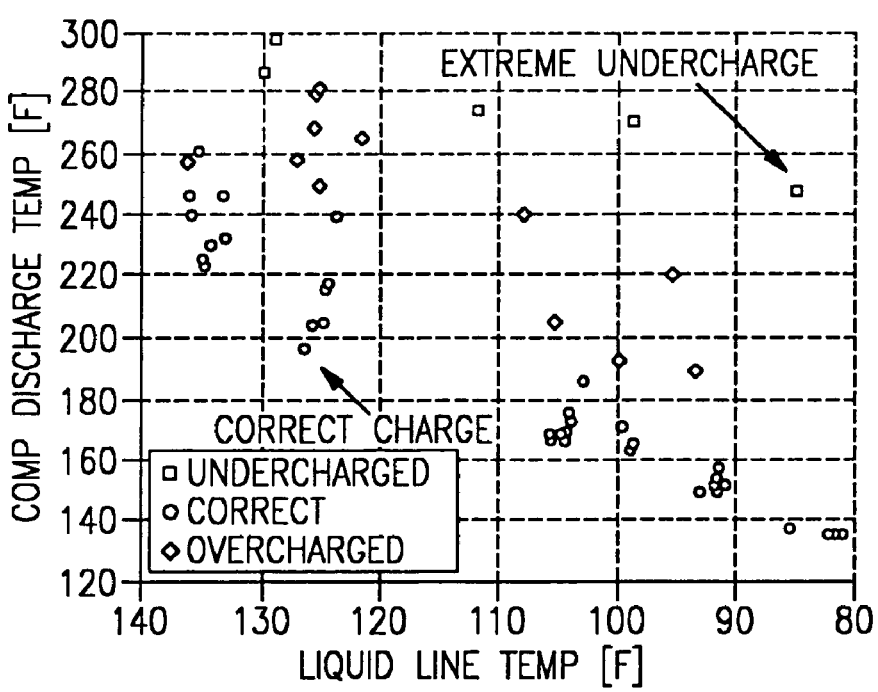
FIG. 7 is a graphic illustration of various refrigerant charge conditions as a function of liquid line temperature and compressor discharge temperature.

The effectiveness of using the third temperature measurement to calculate residual values R1 and R2 to more particularly identify the applicable charge condition of a system is illustrated in FIGS. 6 and 7. In FIG. 6, the compressor discharge temperature is plotted as a function of the coil temperature for a variety of refrigerant charge conditions. The results as plotted in FIG. 6, rather than being randomly mixed as in FIG. 3, shows that each of the extreme undercharge points and the extreme overcharge points are somewhat together and isolated from the correct charge points. Similarly, in FIG. 7 wherein the compressor discharge temperature is plotted as a function of liquid line temperature for a plurality of refrigerant charge conditions, each of the points representing correct charge, extreme undercharge and extreme overcharge conditions are respectively isolated and therefore able to be distinguished over the other groups representing other refrigerant charge conditions. A further illustration of the effectiveness of the three temperature sensor approach for calculating residual values R1 and R2 and then using those values to further refine the process is shown in FIG. 8. That is, if each of the three temperatures are sensed and plotted on the three dimensional graph, each of the points representing a proper charge will be bordered in the plane by the curve a, each of the points representing overcharge conditions will be in the plane bordered by the curve b, and each of the points representing an extreme undercharged condition will be within the plane bordered by the curve c.

Other combinations of residuals are possible. For example, the coefficients may be chosen so that R1 indicates whether the charge is abnormally low or not, while R2 indicates whether the charge is abnormally high or not. In this case, the logic in the table in [0030] should be adjusted accordingly. Similarly, the equations in [0027] and [0029] may be modified to include other terms, e.g. cubic terms, cross-products, and other variations that will be apparent to one skilled in the art.

Although the fore-discussed method is most ideal, a more rudimentary approach may be used. This method is still dependant on the same three strategically placed temperature sensors on the refrigerant system. It may use either a single residual equation or a combination of two residual equations. The controller then determines if the charge is near normal versus significantly off by comparing the residual equation or equations to predefined threshold or thresholds. When the charge is significantly off, this method does not predict whether it is over or under charged, just off charge.

If the charge is determined to be near normal, then the comparative CTD method is used to precisely predict the accuracy of the charge. If the charge is significantly off, it is dependant on the service technician skills to know whether the system is deficient or contains extra charge. This would work similar to a warning light on the dash of an automobile by illuminating an indicator if the refrigerant charge is not correct within predefined tolerances.

While the present invention has been particularly shown and described with reference to preferred and alternate embodiments as illustrated in the drawings, it will be understood by one skilled in the art that various changes in detail may be effected therein without departing from the spirit and scope of the invention as defined in the claims.

We claim:

1. A method of determining the adequacy of refrigerant charge in an air conditioning system having a refrigerant flowing serially through a compressor, a condenser, an expansion device and an evaporator, comprising the steps of:

sensing the temperature of the refrigerant at an intermediate point in said condenser to obtain a first temperature;

sensing the temperature of the refrigerant at a discharge end of said condenser to obtain a second temperature;

calculating the difference between said first and second temperatures to obtain a coil temperature difference;

comparing said coil temperature difference with predetermined values to determine the refrigerant charge adequacy of the system sensing the temperature at the discharge of the compressor to obtain a third temperature; and using said third temperature to validate the determination of charge adequacy by calculating a first residual value R1 using said first, second and third temperatures; and on the basis of the residual value R1 determining whether the refrigerant charge is at neither a significantly high nor a significantly low level and therefore useful for the two-temperature method of determining charge adequacy, or whether the refrigerant charge level is significantly high or whether the level of refrigerant charge is significantly low.

2. A method as set forth in claim 1 wherein the step of calculating the coil temperature differences is accomplished by way of a comparator.

3. A method as set forth in claim 1, and including the additional steps of:

calculating a second residual value R2 using said first, second and third temperatures; and on the basis of the residual values R1 and R2 determining whether the refrigerant charge is at neither a significantly high nor a significantly low level and therefore useful for the two temperature method of determining charge adequacy, or whether the refrigerant charge level is significantly high or whether the level of refrigerant charge is significantly low.

4. A method as set forth in claim 1, in which the coefficients required to compute residual R1 are determined from experimental data using a support vector classifier.

5. A method as set forth in claim 3 wherein, if the residual value R1 is on one side of a predefined R1 threshold, then the determination is made that the refrigerant charge level is at neither a significantly high nor significantly low level.

6. A method as set forth in claim 5 wherein, when said first residual R1 is on the other side of a predefined R1 threshold and said second residual R2 is on a certain side of another predefined R2 threshold, a determination is made that the refrigerant charge level is significantly higher than normal.

7. A method as set forth in claim 5 wherein, when said residual R1 is on the other side of a predefined R1 threshold and said residual R2 is on the other side of a predefined R2 threshold, a determination is made that the refrigerant charge level is significantly lower than normal.

8. A method as set forth in claim 1 wherein the residual R1 is computed according to the equation $$R1 = a*T\_C + b*T\_LL + c*T\_CD + d*T\_GD^2 + e$$

where:
- $T\_C$ is the temperature at the condenser,
- $T\_LL$ is the temperature at the liquid line,
- $T\_CD$ is the temperature at the compressor discharge,
- a, b, c, d, e are constant numbers.

9. A method as set forth in claim 3 wherein the second residual R2 is computed according to the equation $$R2 = f*T\_C + g*T\_LL + h*T\_CD + i*T\_CD^2 + j$$

where f, g, h, i and j are constant numbers such that R2 <0 whenever R1 <0 and the refrigerant at an intermediate point in said condenser is subcooled liquid, and R2 <0 whenever R1 <0 and the refrigerant at an intermediate point in said condenser is superheated gas.

* * * * *